United States Patent
Cantwell, Jr. et al.

[15] 3,683,380
[45] Aug. 8, 1972

[54] CASCADED DIGITAL INTEGRATOR TARGET DETECTION SYSTEM

[72] Inventors: Thomas C. Cantwell, Jr., Fullerton; Richard D. Wilmot, Yorba Linda, both of Calif.

[22] Filed: Jan. 11, 1971

[21] Appl. No.: 105,173

[52] U.S. Cl..............................343/16 R, 343/5 DP
[51] Int. Cl...................................................G01s 9/02
[58] Field of Search..........................343/5 DP, 16 R

[56] References Cited

UNITED STATES PATENTS 3,077,595  2/1963  Frost.....................343/16 R X

Primary Examiner—T. H. Tubbesing
Attorney—W. H. MacAllister, Jr. and George Jameson

[57] ABSTRACT

An automatic radar target detector system, in a radar receiving system, which performs antenna beam shape weighting as a part of the detection process. A first select control circuit controls the operation of a first accumulator to increment or decrement its stored count associated with each range bin interval as a function of the amplitude of the quantized video returns from each range bin interval. A second select control circuit controls the operation of a second accumulator to increment or decrement its stored count associated with each range bin interval as a function of the amplitude of the scaled-down amplitude of the output digital signals from the first accumulator to perform the antenna beam shape weighting. The output of the second accumulator is then applied to threshold detection and peak detection circuits to control other circuits for target range and azimuth detection.

12 Claims, 11 Drawing Figures

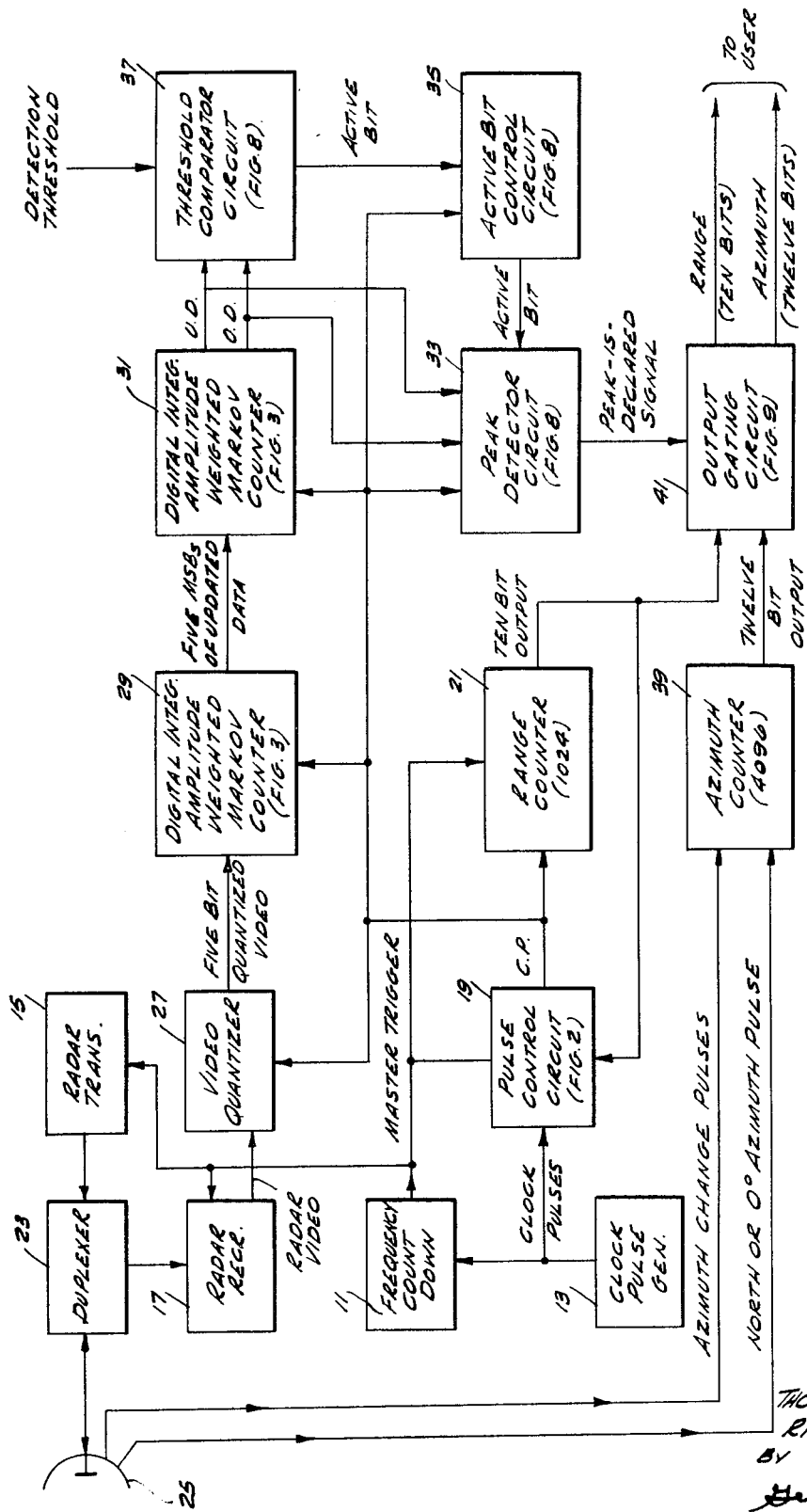

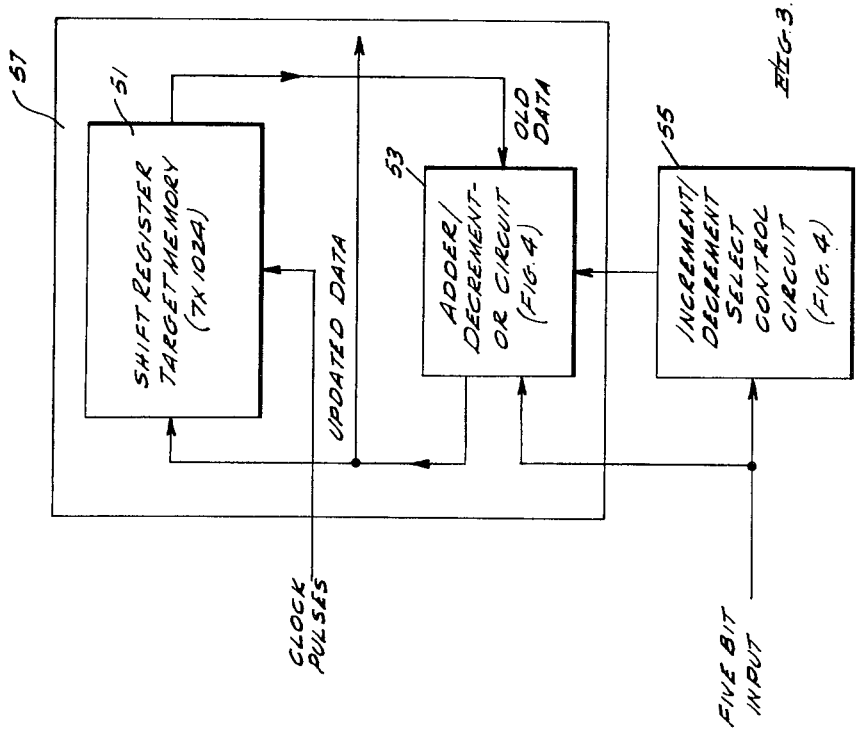
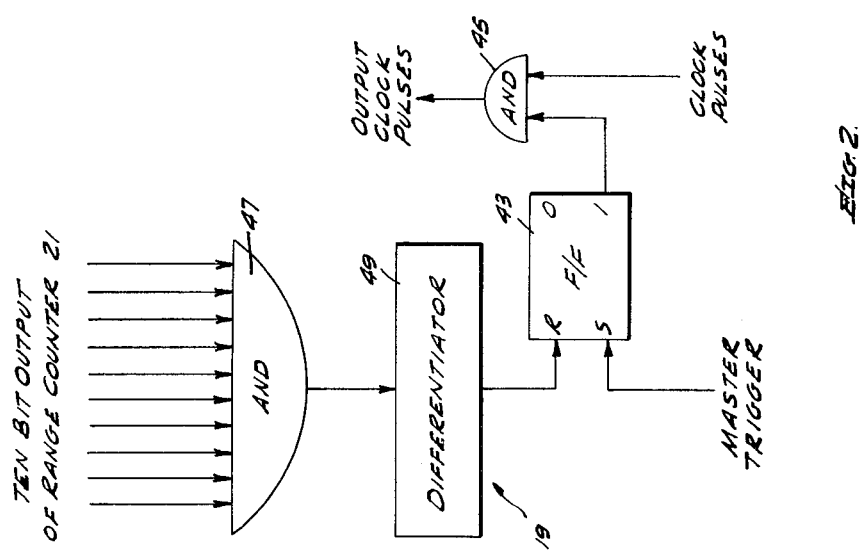

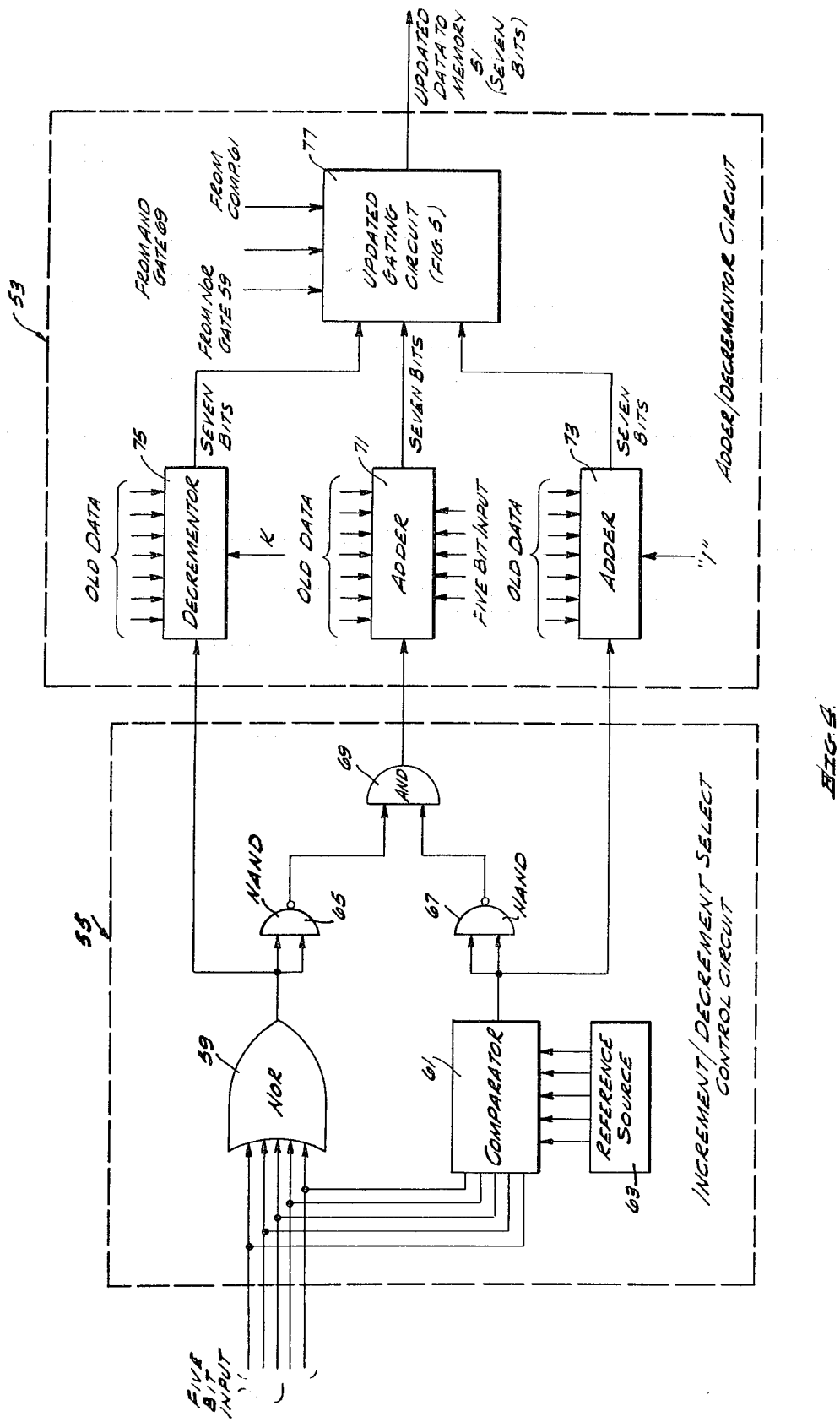

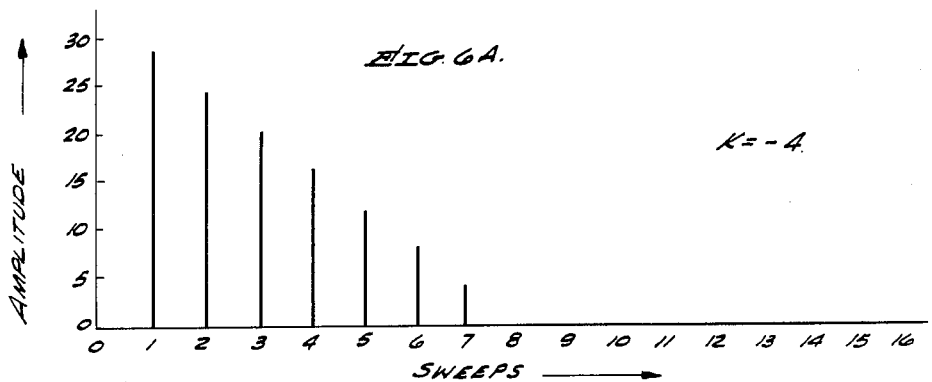
FIG. 6A.
$K = -4$
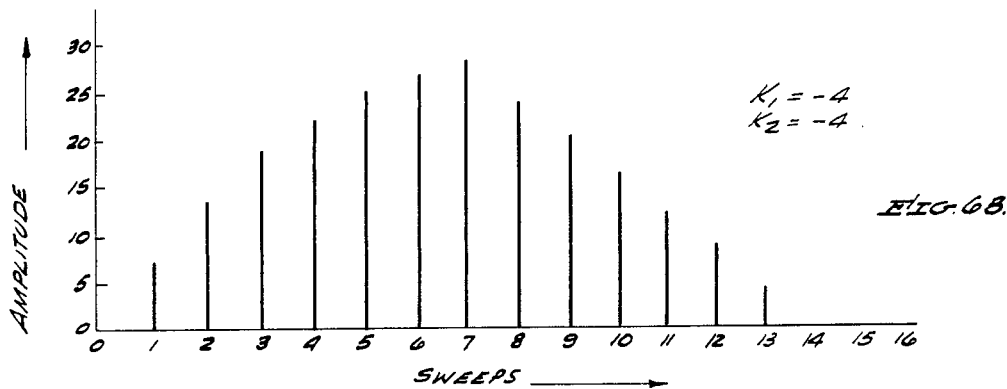
$K_1 = -4$
$K_2 = -4$
FIG. 6B.
$K_1 = -3, K_2 = -4$
7, 13, 18, 22, 26, 29, 31, 32, 33, 29, 25, 21, 17, 13, 9, 5, 1, 0
$K_1 = -2, K_2 = -3$
7, 13, 19, 24, 29, 33, 37, 40, 43, 45, 47, 48, 49, 46,
43, 40, 37, 34, 31, 28, 25, 22, 19, 16, 13, 10, 7, 4, 1, 0.
FIG. 6C.

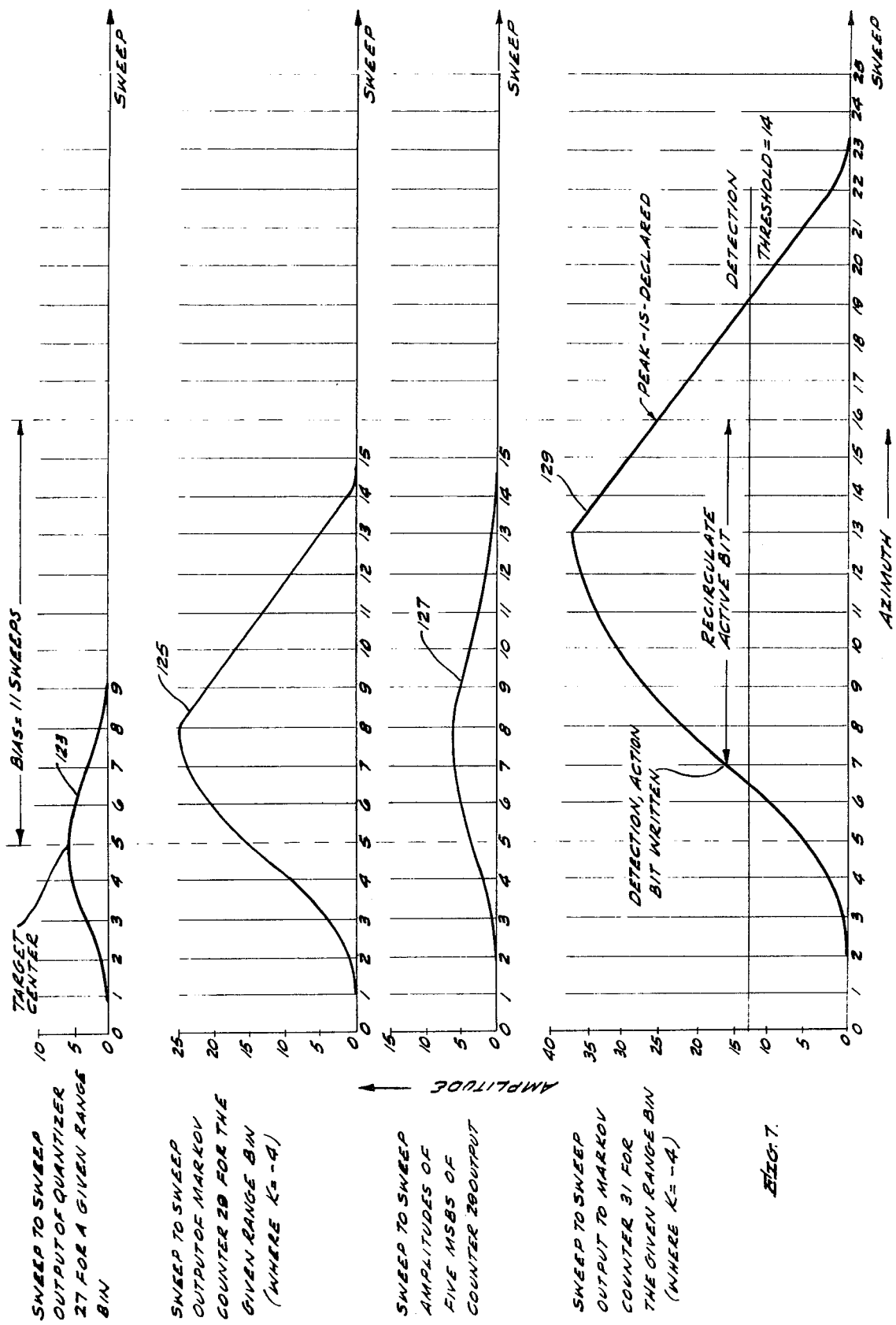

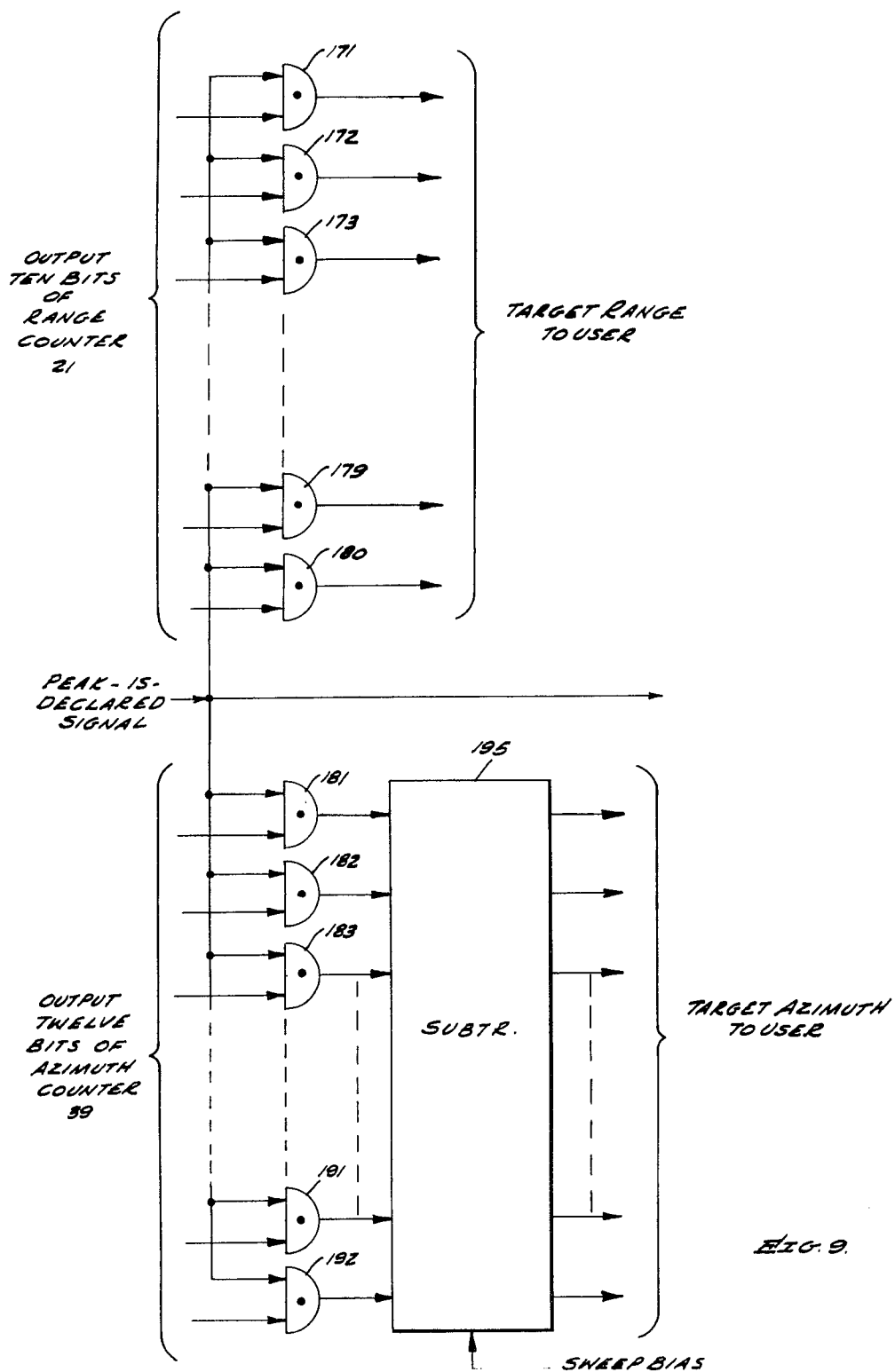

3,683,380

CASCADED DIGITAL INTEGRATOR TARGET DETECTION SYSTEM

BACKGROUND OF THE INVENTION

1. Field of the Invention

This invention relates to radar target detectors and particularly to a cascaded, digital integrator target detector which is capable of performing antenna beam shape weighting as a part of the target detection process.

2. Description of the Prior Art

One type of prior art radar detector is the binary Markov counter detector, utilized in the AN/TSQ-51 Video Processor and the 407-L Beacon Processor, which uses an up-down counter for every range bin with the counter incrementing by one for a quantized video return above at the amplitude quantizing threshold (a video hit) and decrementing by one for a video return below the amplitude quantizing threshold (a video miss). A target is declared when the detector reaches a predetermined threshold level, thereby establishing the leading edge of the target in azimuth. The counter is then reset to zero and increments with misses and decrements with hits until the end of the target (the trailing edge) in azimuth is found. The azimuth center of the target is estimated by taking the arithmetic means of the leading and trailing edges in azimuth. Because of the binary nature of the detector input and the equal weighting of hits and misses, the detection sensitivity of the detector is degraded by about two decibels (2 db), which means that the radar range of this detector is decreased by about 12 percent and the radar coverage area for automatic tracking is decreased by approximately 25 percent. Furthermore, weather returns, radar interference, and jamming, etc., which amount to noise on the receiver, may produce sufficient hits in a range bin to indicate a valid target return.

A second type of Markov counter radar detector, as disclosed in U. S. Pat. No. 3,406,390, uses the quantized (digitized) video returns from each range bin to change the count of a binary counter as a function of the digital amplitude of the quantized video. The azimuth center of a target is computed to be half way between the leading and trailing edge azimuth positions. This utilization of all of the video amplitude information improves the detection sensitivity by about 2 db. which in turn increases the detection range by 12 percent and the radar coverage area for automatic tracking by 25 percent.

Both of the aforementioned types of Markov counter radar detectors have a relatively poor azimuth beam splitting accuracy. The impulse response of these detectors are badly skewed. Because the impulse response of each detector type is not symmetrical and is not like the antenna beam shape, the azimuth accuracy is poor.

SUMMARY OF THE INVENTION

Briefly, Applicants have provided a radar target detector which utilizes two (or more) cascaded, digital integrator target detectors, in conjunction with other comparator, detector, control, counter and gating circuits, to perform antenna beam shape weighting as part of the detection process.

It is therefore an object of this invention to provide an improved automatic radar target detector system which automatically processes digitized input data on a real time basis.

Another object of this invention is to provide an improved radar target detector which utilizes all of the video amplitude information to improve the detection sensitivity.

Another object of this invention is to provide an improved amplitude-weighted, digital integrator target detection system.

A further object of this invention is to provide a novel, amplitude-weighted, cascaded digital integrator target detection system which performs antenna beam shape weighting as a part of the detection process.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein:

FIG. 1 is a schematic block diagram of a preferred embodiment of this invention when used for processing radar video returns.

FIG. 2 is a schematic block diagram of the pulse control circuit 19 of FIG. 1.

FIG. 3 is a schematic block diagram of one of the amplitude-weighted Markov counters of FIG. 1.

FIG. 4 is a schematic block diagram of the increment/decrement select control 55 and adder-decrementor 53 circuits of FIG. 3.

FIGS. 6A, 6B and 6C, respectively, illustrate graphs and a chart useful in explaining the impulse responses of a single and a cascaded Markov detector system.

FIG. 7 illustrates graphs of the returns of a target in one range bin over consecutive sweeps to show the occurrence of antenna beam shape weighting as part of the detection process.

FIG. 9 is a schematic block diagram of the output gating circuit 41 of FIG. 1.

DESCRIPTION OF THE PREFERRED EMBODIMENT

Figure 5:
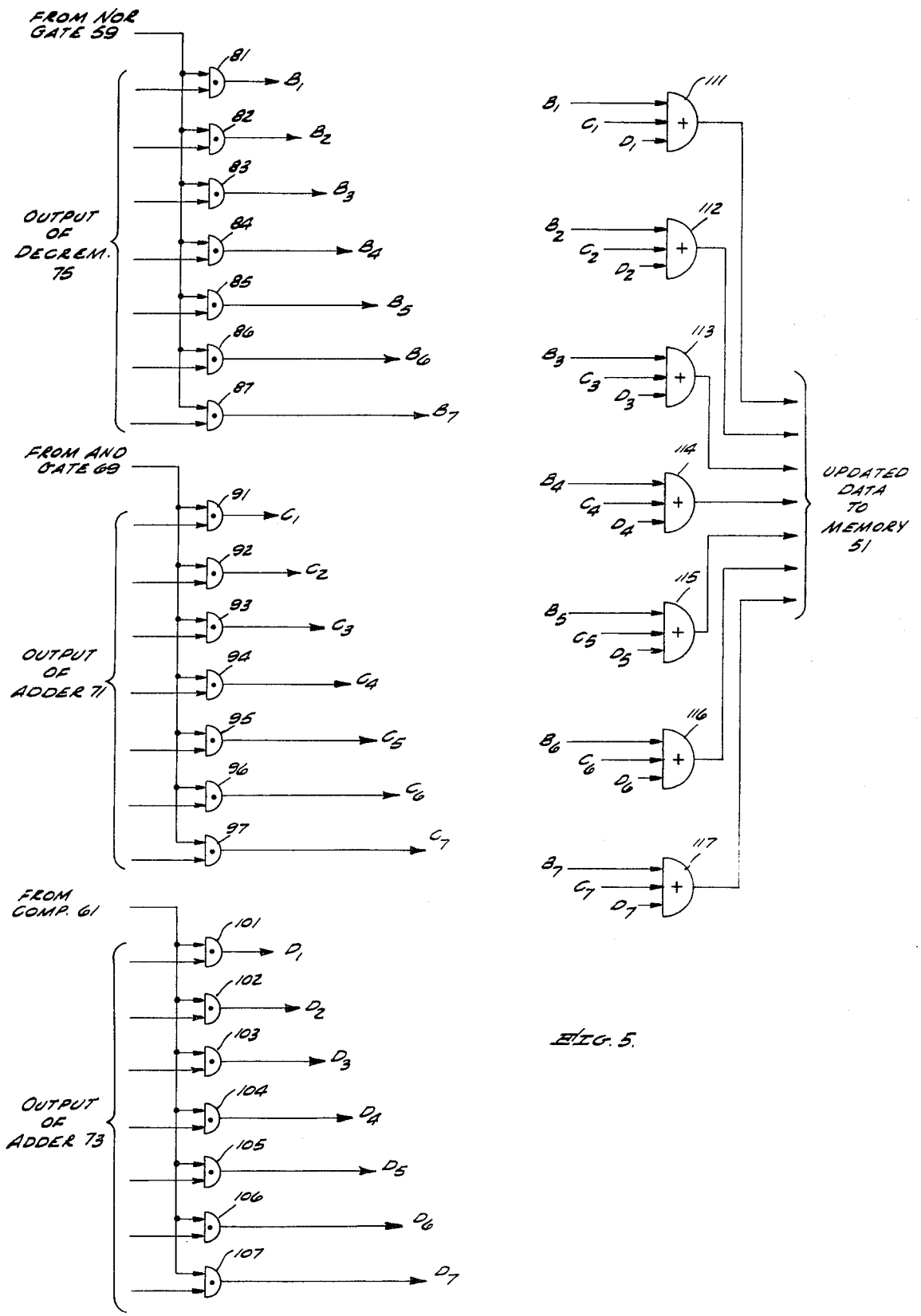
FIG. 5 is a schematic block diagram of the updated gating circuit 77 of FIG. 4.

Referring now to the drawings, FIG. 1 illustrates a preferred embodiment of this invention when used for processing radar video returns. A frequency countdown circuit 11 counts down clock pulses from a clock pulse generator 13 to periodically develop a master trigger, which may have a pulse repetition frequency of several hundred pulses per second. Each master trigger is applied to a radar transmitter 15, a radar receiver 17, a pulse control circuit 19, a binary range counter 21 and an indicating system (not shown) to synchronize the radar system operation. In response to the master trigger, the radar transmitter 15 causes a high powered, modulated radio frequency (RF) pulse of a preselected pulse width to be applied through a conventional duplexer 23 to an antenna assembly 25, from which the RF pulse is radiated into space. The master trigger also resets the binary range counter 21 to a zero count, and enables the pulse control circuit 19 to pass clock pulses to be counted by the range counter 21. Clock pulses are also applied to a thirty-two level video quantizer 27, digital integrator, amplitude weighted Markov counters 29 and 31, a peak detector circuit 33 and an active bit control circuit 35. It should be noted that, although an amplitude-weighted Markov counter type of digital integrator system will be described in detail, the invention encompasses the use of any other type of cascaded digital integrator target detector.

The counter 21 may, for example, be a Mod 1024 counter defining 1024 radar range intervals (range bins) in space from which reflected energy may be received by the radar receiver 17, via the antenna assembly 25 and duplexer 23. The receiver 17 receives the energy from each range bin and develops video returns whose amplitudes vary as a function of the received signal energy. These video returns from the receiver 17 are sampled at the clock pulse rate by the video quantizer 27, which quantizes or digitizes the video returns into, for example, 32 amplitude levels to provide a five bit digital code, whose numerical value or amplitude represents the relative value of the peak of each video return with respect to a preselected amplitude quantizing threshold level.

The five bit quantized video from the quantizer 27 is applied to the amplitude-weighted Markov counter 29 which stores in 1024 respective memory locations a seven bit word for each of the 1024 range bins. Since the detector system of this invention must operate in real time and automatically detect any target within the radar set's resolution capability (one pulse width), the range counter 21 must be synchronized with the radar master trigger to control the operation of the pulse control circuit 19, which in turn controls the accessing of the 1024 memory locations in the Markov counter 29 by applying clock pulses thereto. Each memory location in the counter 29 is assigned to a corresponding range bin which equals the range occupied by one radar pulse width. At each clock pulse time a seven bit word is accessed from a memory location, while another seven bit word from a previous memory location is fed back into its proper memory location in the Markov counter 29. The stored words for the 1024 range bins in the counter 29 are sequentially accessed and compared at the clock pulse rate with the corresponding five bit digital codes developed by the quantizer 27 for the 1024 range bin intervals occurring during one complete radar ranging time. During each range bin interval, the counter 29 increments the count of a corresponding stored word at a rate proportional to the amplitude of the corresponding five bit quantized video or decrements the count of the corresponding stored word at an independently selectable rate if the quantized video return for that range bin interval is zero or below the amplitude quantizing threshold. As a result, during each range bin interval of a given radar sweep or radar ranging time, as the incoming video is being sequentially quantized at the clock pulse rate, the old data in the counter 29, which had been updated during the previous sweep, is accessed at the corresponding clock pulse time, varied or updated as a function of the amplitude of the quantized video occurring during that range bin interval, and then fed back into the proper range bin of the counter 29 at the time of the following clock pulse.

The seven bit updated data count for each range bin sequentially appears at the output of the counter 29, and is effectively divided by four by utilizing only the five most significant bits (MSBs) in order to scale down the updated data (U.D.) before applying it to the amplitude weighted Markov counter 31, which is similar in structure and operation to the counter 29. The counter 31 also contains a seven bit word in each of 1024 range bins, which are sequentially accessed and updated at the clock pulse rate as a function of the amplitude of the five MSBs of the output of the counter 29, and then fed back as updated data into the corresponding memory locations or range bins of the counter 31, in the same manner previously described in relation to the counter 29. The updated data in the 1024 range bins of one radar sweep then becomes the old data that is sequentially accessed during the following radar sweep. It should be noted at this time that, although only two amplitude-weighted Markov counters 29 and 31 are shown cascaded in FIG. 1, more than two Markov counters can be cascaded in conformance with the teachings of this invention in order to improve the performance of the detection system.

The old data (O.D.) and the updated data (U.D.) are both applied to the peak detector circuit 33 and to a threshold comparator circuit 37. The threshold comparator circuit 37 sequentially compares the corresponding range bins of the input old data and updated data signals with a preselected digital detection threshold level and generates an active-bit signal to indicate the detection of the leading edge of a target in a range bin, whenever the updated data in the range bin is above the threshold level at the same time that the old data in that range bin is below the threshold level. Any active bit signal, that is generated in one of the 1024 range bins in a radar sweep by the circuit 35, is applied to the active bit control circuit 35, which stores that active bit signal in a corresponding one of 1024 memory locations, assigned to that range bin.

Any active bit stored in the circuit 35 is accessed at the clock pulse rate during its range bin interval in each of subsequent sweeps and applied to the peak detection circuit 33, which uses the active bit, old data, and updated data signals to generate a peak-is-declared signal when the updated data is smaller in amplitude than the old data for three consecutive sweeps. A stored active bit in a range bin is accessed from a memory location in the circuit 35 at one clock pulse time and re-stored in that memory location at the following clock pulse time, provided that no peak-is-declared signal is generated by the circuit 33. The generation of a peak-is-declared signal by the circuit 33 prevents the active bit, that was accessed at one clock pulse time, from being re-stored in the associated memory location or range bin of the circuit 35 at the following clock pulse time, thereby erasing the active bit from that memory location.

The twelve bit output of a binary azimuth counter 39, along with the ten bit output of the range counter 21 and the peak-is-declared signal from the circuit 33, are applied to an output gating circuit 41 to supply digital signals representative of the azimuth and range, respectively, of a target in a given range bin at the time that the peak-is-declared signal is generated for that range bin. As specified before, the range counter 21 has 1024 states, with each state representing a range bin. The state of the ten bit output of the counter 21 therefore indicates the range bin of a target, when the peak-is-declared signal is generated by the circuit 33.

The azimuth counter 39 may, for example, be a Mod 4096 counter defining 4096 azimuth intervals. The counter 39 counts azimuth change pulses from the antenna assembly 25 until its twelve bit output is full of binary "1"s (a digital count of 4095), after which it is reset by a north or zero degree (0°) azimuth pulse from the assembly 25 so that it may subsequently start counting azimuth change pulses again. To derive the 0° azimuth pulse and the 4095 azimuth change pulses, the circumference of a rotary section (not shown) of the antenna assembly 25 has a digitizer (not shown) mounted on it, with the digitizer having 4096 magnetic spots positioned at equal intervals around the circumference of the antenna assembly 25. A preselected magnetic spot, which represents 0° in azimuth, is positioned at a different radius from that of the other 4095 magnetic spots. Each time that the preselected magnetic spot passes 0° in azimuth, a first read amplifier (not shown) mounted on a stationary section (not shown) of the assembly 25 generates a north or 0° azimuth pulse to reset the azimuth counter 39 to a zero count. As each of the following 4095 magnetic spots rotates past a second read amplifier (not shown) mounted on the stationary section, a voltage pulse is generated. With each complete revolution of the rotary section of the assembly 25, a 0° azimuth pulse resets the counter 39 and a serial stream of 4905 azimuth change pulses is applied to the counter 39 to generate one complete counting cycle.

Upon receiving a peak-is-declared signal for a range bin, the output gating circuit 41 is enabled to pass signals containing information that a target has been detected and identifying the range bin and azimuth position in which the target was detected. This target information is then passed to a user, which may be a computer, an indicating system, a digital readout, or any other suitable output device for utilizing the target information.

During the search for the detection threshold, each of the Markov counters 29 and 31 of FIG. 1, as previously described, increments its stored count for a range bin at a rate determined by the amplitude of its five bit digital input and decrements that stored count at an independently selectable rate when the amplitude of its five bit digital input is zero. Each Markov counter continues incrementing and decrementing until the detection threshold is reached. The detection threshold is switch selectable (not shown) to accommodate different radar parameters and false alarm probabilities.

Because the probability of any range bin, in either of the Markov counters 29 and 31, reaching a particular state depends only upon the present state and transition probabilities (the Markov property), the probability of reaching a predetermined level, such as the detection threshold level in the counter 31, with noise only can be found from a transition probability matrix. Because this is a regular Markov chain, the stationary probabilities can be found by raising the matrix M to successively higher powers. As $M^N$ converges as N (an integer) approaches infinity, all of the row vectors will become the same and the column vectors will indicate the stationary probability of being in a given count. For a predetermined level T less than the maximum increment count, the transition matrix M is given by the following table.

TABLE I

| Present State of Counter | Next State of Counter | | | | | | | |
|---|---|---|---|---|---|---|---|---|
| | 0 | 1 | 2 | 3 | 4 | 5 | 6 | T |
| 0 | $P_0$ | $P_1$ | $P_2$ | $P_3$ | $P_4$ | $P_5$ | $P_6$ | $P_T$ |
| 1 | $P_0$ | 0 | $P_1$ | $P_2$ | $P_3$ | $P_4$ | $P_5$ | $P_{T-1}$ |
| 2 | 0 | $P_0$ | 0 | $P_1$ | $P_2$ | $P_3$ | $P_4$ | $P_{T-2}$ |
| 3 | 0 | 0 | $P_0$ | 0 | $P_1$ | $P_2$ | $P_3$ | $P_{T-3}$ |
| 4 | 0 | 0 | 0 | $P_0$ | 0 | $P_1$ | $P_2$ | $P_{T-4}$ |
| 5 | 0 | 0 | 0 | 0 | $P_0$ | 0 | $P_1$ | $P_{T-5}$ |
| 6 | 0 | 0 | 0 | 0 | 0 | $P_0$ | 0 | $P_{T-6}$ |
| ⋮ | | | | | | | | |
| T | 1 | 0 | 0 | 0 | 0 | 0 | 0 | 0 |

The rows in Table I represent the present state and the columns represent the next state. P represents a probability and the subscript number represents the probability that the five bit input to the Markov counter is equal to that subscript number for noise as an input to the quantizer 27. For example, $P_2$ is the probability that the five bit input to a Markov counter is the binary equivalent of the decimal number 2, namely, 00010. Typical values for $P_0$, $P_1$, $P_2$, $P_3$, $P_4$, $P_5$ ... $P_T$ are 0.7, 0.25, 0.045, 0.004, 0.001, 0 .... 0, with the sum of the entries in each row being equal to 1. The count of the Markov counter can only advance to its next state with the probability indicated. For example, with a present count of three maintained in the counter, the count can advance to four with the probability of 0.25 or 25 percent, to five with the probability of 0.045 or 4.5 percent, to six with the probability of 0.004 or 0.4 percent, can decrease to two with the probability of 0.7 or 70 percent, or can go to any other state with the probability of 0 percent. A similar matrix applies for T greater than the maximum increment value. Thus, an analytical technique can be easily applied to determine the false alarm rate for either of the Markov counters 29 and 31. The system of FIG. 1 will now be explained in more detail by referring to other FIGs.

FIG. 2 illustrates a schematic block diagram of the pulse control circuit 19 of FIG. 1. Each time that a master trigger is applied to the set (S) side of a flip-flop 43, the "1" output of the flip-flop 43, which is coupled to an AND gate 45, changes to a binary "1" state to enable the AND gate 45 to pass clock pulses to the range counter 21, the video quantizer 27, the Markov counters 29 and 31, the peak detector circuit 33, and the active bit control circuit 35. The 10 bit output from the range counter 21 is applied to an AND gate 47. When the range counter has filled up with binary "1" states, or reached a count of 1023, the AND gate 47 develops an output "1" state signal, which is differentiated by a differentiator 49 and applied to the reset (R) side of the flip-flop 43. Upon being reset, the "1" output of the flip-flop 43 changes to a binary "0"

state, thereby inhibiting the passage of clock pulses through the AND gate 45 until the flip-flop 43 is set by the following master trigger.

FIG. 3 illustrates the mechanization of one of the Markov counters 29 and 31 of FIG. 1. A shift register target memory 51 comprises, for example, seven shift registers (not shown) of 1024 bits in length each (designated as 7 × 1024), with each bit corresponding to a range bin. Thus, each shift register contains a memory bit for each range bin in the entire radar sweep. Corresponding bits in the seven shift registers together comprise a seven bit binary word related to the previously updated amplitude of a target stored in the corresponding range bin of the radar sweep. Each of the shift registers is shifted at the clock pulse rate by clock pulses from the pulse control circuit 19.

At any given clock pulse time a seven bit word is accessed from a range bin location in the memory 51 and applied as "old data" to an adder/decrementor circuit 53. The five bit input (either the quantized video from the quantizer 27 when the Markov counter 29 is being considered, or the five MSBs of updated data from the Markov counter 29 when the Markov counter 31 is being considered) is applied to the adder/decrementor circuit 53 and to an increment/decrement select control circuit 55. The memory 51 and the circuit 53 form an accumulator 57 which is controlled by the circuit 55 to update the old data as a function of the five bit input number to the Markov counter. The control circuit 55 analyzes the five bit input number to determine whether to add or to decrement from the previous value, and if to add, how much to add. In an increment mode of operation, the control circuit 55 causes the adder/decrementor circuit 53 to add to the old data output of the memory 51 either a fixed number, such a binary "1," when the five bit input number equals or exceeds a reference number (to be explained later), or the five bit input number when the five bit input number is less than the reference number. In one type of decrement mode of operation, the control circuit 55 causes the adder/decrementor circuit 53 to subtract from the old data output of the memory 51 a quantity K, which may represent either a fixed number or a fraction of the old data output, when the five bit input number is zero. In an alternate type of decrement mode of operation, the control circuit 55 causes the adder/decrementor circuit 53 to multiply the old data output of the memory 51 by a quantity K, which in this case may be equal to 0.9, for example, when the five bit input number is zero. The output of the adder/decrementor circuit 53 is the seven bit updated data which is fed back into the input of the memory 51 at the following clock pulse time. At this same time a different seven bit old data output from the following range bin is applied to the circuit 53 to be updated by the five bit input for the corresponding range bin. As a result, the stored words for the 1024 range bins in the memory 51 are sequentially accessed and updated by the corresponding five bit input numbers at the proper respective range bin times, such that after one complete radar ranging time, the stored words for the 1024 range bins have been shifted back to their original positions.

By mechanizing the Markov counter as shown in FIG. 3, the up and down counting circuits 53 and 55 (which will be subsequently discussed) are multiplexed or time shared for each of the 1024 range bins in a radar sweep. This multiplexing is essentially the same as having 1024 different count logic devices.

The circuits 53 and 55 will now be examined in more detail by referring to FIGS. 4 and 5. The five bit input of either one of the Markov counters 29 and 31 is simultaneously applied to NOR gate 59 and a comparator 61. The comparator 61 may have an eight bit capacity and is a conventional comparator, such as a dual four bit comparator DM7200/DM8200, manufactured by the National Semiconductor Corporation of Santa Clara, California. A reference source 63 which may be a set of switches, a set of flip-flops or any suitable source of a multibit binary word has, for example, a five bit output coupled to the comparator 61 to establish a reference level or number for the comparator 61. The comparator 61 and reference source 63 operate together to cause the comparator to produce a binary "0" state output whenever the five bit input number is less than the number established by the reference source 63, and to develop a binary "1" state output when the five bit input number is equal to or exceeds the reference number from the reference source 63. The outputs from the NOR gate 59 and the comparator 61 are respectively applied to NAND gates 65 and 67, which in turn have their outputs coupled to an AND gate 69.

In operation, when the five bit input number to the select control circuit 55 is zero or a binary 00000, the NOR gate 59 develops a "1" state output and the comparator 61 develops a "0" state output. The "1" state output from the NOR gate 59 causes the NAND gate 65 to develop a "0" state output which causes the AND gate 69 to develop a "0" state output, even though the "0" state output from the comparator 61 causes the NAND gate 67 to develop a 1 state output. The 0 state output from the AND gate 69 disables an adder 71 in the adder/decrementor circuit 53, thereby preventing the old data from the memory 51 from being updated by the five bit input. At the same time, the 0 state output from the comparator 61 is applied to another adder 73 in the circuit 53 to prevent the adder 73 from incrementing the old data from the memory 51 by a fixed number, such as a binary 1. Finally, the 1 state output from the NOR gate 59 is also applied to a decrementor 75, which may be mechanized as either a subtractor or a multiplier.

When the decrementor 75 is chosen to be a multiplier, the quantity K may be a decimal number such as 0.9, for example. In this case, each time that the amplitude of the five bit input is equal to zero, the O.D. is multiplied by 0.9, with the decreased updated data product thereof being subsequently restored in the memory 51.

When the decrementor 75 is chosen to be a subtractor, the quantity K is subtracted from the old data from the memory 51. In this case the quantity K may be either a switch selectable fixed number, such as 4, or may be some fraction of the old data, such as one-eighth of the old data. To subtract a quantity such as one-eighth of the old data, K would be equal to the four most significant bits of the old data from the memory 51. If the fraction one-fourth of the old data was desired, K would be equal to the five most significant bits of the old data. For illustrative purposes, K will be subsequently chosen as a fixed number rather than as a fraction (or as a decimal number). If K is chosen to be a fixed number, it can be any number within the range of from −1 through −8, depending upon the radar system requirements. If, for example, $K = -4$, then 4 is subtracted from the old data each time that the amplitude of the input five bit number is equal to zero with the difference being re-stored in the memory 51 as updated data for that range bin. The seven bit output of the decrementor 75 is then applied to an updated gating circuit 77, which is also in the adder/decrementor circuit 53. The outputs from the NOR gate 59, the AND gate 69 and the comparator 61 are applied to the circuit 77 as enabling signals when in a 1 state. Since only the NOR gate 59 is in a 1 state at this time, only the output of the decrementor 75 will be allowed to pass through the circuit 77 as updated data. This circuit 77 will be later described in more detail.

Assume the reference source 63 is set to develop an output of 29, or a binary 11101. This reference level of 29 will establish the level at which the old data from the memory 51 will no longer be updated by the amplitude of the five bit input. The circuits 61, 63, 67 and 73 are included in the Markov counter to prevent saturation of the counter. In the Markov counter 29, these circuits are specifically incorporated to prevent radar interference or jamming from causing the declaration of a false target by incrementing the old data by a large quantity. In the Markov counter 31 these circuits are incorporated to prevent the counter 31 from being saturated by long blocks of ground clutter.

When the five bit input has an amplitude of from 1 through 28, AND NOR gate 59 develops a 0 state which disables the decrementor 75 and also causes the NAND gate 65 to apply a binary 1 to the upper input of the AND gate 69; and the comparator 61 develops a 0 state output which disables the adder 73 and also causes the NAND gate 67 to apply a 1 state signal to the lower input of the AND gate 69. Since both inputs to the AND gate 69 are 1 state signals, the AND gate 69 generates a 1 state signal which enables the adder 71 to update or add the amplitude of the five bit input number to the old data from the memory 51. The 1 state output of the AND gate 69 also enables the updated gating circuit 77 to pass the seven bit output from the adder 71.

Assume that the five bit input number has an amplitude from 29 through 31. Since, for illustrative purposes, the output of the reference source 63 was chosen to be 29 (a binary 11101), the NOR gate 59 will generate a 0 state to disable the decrementor 75, and cause the NAND gate 65 to apply a 1 state to the upper input of the AND gate 69; and the comparator 61 will generate a 1 state which causes the NAND gate 67 to apply a 0 state to the lower input of the AND gate 69 to thereby disable the adder 71. This 1 state from the comparator 61 is also applied to the adder 73 to enable the adder 73 to increment the old data from the memory 51 by the selected fixed count of a binary 1, and is further used to enable the circuit 77 to pass the seven bit output of the adder 73. The updated gating circuit 77 will now be examined more fully by referring to FIG. 5.

FIG. 5 discloses that the updated gating circuit 77 comprises groups of AND and OR gates which are switched by the select control circuit 55 of FIG. 4 to selectively pass the outputs from the decrementor 75, adder 71 or adder 73 back to the target memory 51. More specifically, the output of the NOR gate 59 is applied to the upper inputs of AND gates 81 through 87, while the output seven bits of the decrementor 75 are respectively applied to the respective lower inputs of the AND gates 81 through 87. The outputs of the AND gates 81 through 87 are respectively represented by B1 through B7. The output of the AND gate 69 is applied to the upper inputs of AND gates 91 through 97, while the output seven bits of the adder 71 are respectively applied to the lower inputs of the AND gates 91 through 97. The outputs of the AND gates 91 through 97 are represented by C1 through C7. The output of the comparator 61 is applied to the upper inputs of AND gates 101 through 107, while the output seven bits of the adder 73 are respectively applied to the lower inputs of the AND gates 101 through 107. The outputs of the AND gates 101 through 107 are represented by $D_1$ through $D_7$. The outputs from the groups B1 through B7, C1 through C7, and D1 through D7 are each respectively applied to OR gates 111 through 117.

In operation, only one output of the outputs from the NOR gate 59, AND gate 69 and comparator 61 can be in a 1 state during any given range bin interval, depending upon the amplitude of the five bit input number occurring during that range bin interval. When the five bit input number is zero, or a binary 00000, only the output of the NOR gate 59 is in a 1 state to thereby enable the AND gates 81 through 87 to pass the output seven bits from the decrementor 75 through the OR gates 111 through 117 to the target memory 51. In a similar manner when the five bit number has an amplitude between 1 and 28, the output of the AND gate 69 is in a 1 state, and the output seven bits of the adder 71 are passed, via the respective AND gates 91 through 97, through the OR gates 111 through 117, respectively, to the memory 51; and when the five bit number has an amplitude between 29 and 31, the output of the comparator 61 is in a 1 state, and the output seven bits of the adder 73 are passed, via the respective AND gates 101 through 107, through the OR gates 111 through 117, respectively, to the memory 51. By the above procedure, the output data of the decrementor 75, adder 71 or adder 73 is selectively passed as updated data for any given range bin back to the target memory 51.

The impulse response of each of the Markov counters 29 and 31 will now be analyzed. The impulse response of the Markov counter 29 is illustrated in FIG. 6A and can be defined as the subsequent sweep-to-sweep response of the Markov counter 29 to the single pulsing of the Markov counter 29 during a selected range bin interval. For illustrative purposes, the amplitude of the single pulse is chosen to be 28 (which represents that the output of the quantizer 27 is a binary 11100), and the K value for the counter 29 is chosen to be equal to a −4. During the first sweep the counter 29 increments to a value of 28 and stores this count in the selected range bin. The input to the Markov counter 29 for the selected range bin during the following sweeps two through 12 zero or a binary 00000. As a result, the Markov counter 29 decrements the stored count by four for each of the sweeps two through eight, with the count being reduced to zero or a binary 00000 during the eighth sweep. The amplitudes 28, 24, 20, 16, 12, 8, 4 and 0 in FIG. 6A represent the updated data of the counter 29 for the sweeps one through eight, respectively. These amplitudes together form the impulse response of the Markov counter 29 which, it should be noted, is badly skewed. Therefore, if only the Markov counter 29 were used as a detector, its azimuth accuracy would be poor, due to the fact that its non-symmetrical impulse response is not like its antenna beam shape. This failure to match the detector impulse response to the antenna beam shape is the reason when prior art Markov counter radar detectors have relatively poor azimuth accuracy.

To correct the above specified deficiency, two, or more, Markov counters are cascaded for use in target detection. The impulse response of the output of the cascaded, amplitude-weighted Markov counters 29 and 31 of FIG. 1 is illustrated in FIG. 6B and can be defined as the subsequent sweep-to-sweep response of the Markov counter 31 to the single pulsing of the Markov counter 29 during a selected range bin interval. Again, for illustrative purposes, the amplitude of the single pulse is chosen to be 28, and the K values of the Markov counters 29 and 31 are respectively chosen to be equal to −4 and −4.

Since, as was previously specified, the output updated data of the counter 29 is effectively divided by 4 by utilizing only the five MSBs of the seven bit updated data, the inputs to the Markov counter 31 for the sweeps one through eight have the amplitudes seven, six, five, four, three, two, one and zero, respectively. In pursuance with the previous teachings, the resultant output updated data from the counter 31 for the sweeps one through 14 have the amplitudes seven, 13, 18, 22, 25, 27, 28, 24, 20, 16, 12, eight, four and zero, respectively. These amplitudes together form the impulse response of the cascaded two stages of Markov counters 29 and 31. It can be noted that the impulse response of this cascaded Markov counter detector is basically parabolic in shape and is much more symmetrical than the impulse response shown in FIG. 6A. As a consequence, the azimuth accuracy of the two-stage, cascaded Markov counter detector is very good, since the impulse response of FIG. 6B more nearly matches the antenna pattern above the half power beam width points. By cascading more than two Markov counters, the azimuth accuracy increases even more.

The half power beam width points in FIG. 6B lie where the voltage amplitudes are down 6 db or have a value equal to one fourth of the peak value. Since the peak value in FIG. 6B is 28, the half power beam width points have a value of 7. There are eleven sweeps occurring between these half power beam width points. With a twelve bit azimuth counter 39 being utilized in the system of FIG. 1, the rotary section of the antenna assembly 25 moves approximately 0.8789° during one radar sweep interval. This means that the half power beam width, where the K quantities of the counters 29 and 31 are each equal to a −4, is approximately 1.0 degree.

The table of FIG. 6C illustrates the impulse responses of the cascaded Markov counter detector of FIG. 1 for different values of $K$, in a manner similar to that discussed in relation to FIG. 6B. The table shows that for a pulse amplitude of 28 the system will develop an impulse response having a 3 db beam width of approximately 1.2 degrees when the Ks of the counters 29 and 31 (designated as $K_1$ and $K_2$) are respectively equal to −3 and −4, and of approximately 2.1 degrees when $K_1$ = −2 and $K_2$ = −3. Other beam widths can be obtained by selecting different values of the $K_1$ and $K_2$ parameters so that the detector response of the cascaded Markov detector system of FIG. 1 can be adjusted to match a wide variety of antenna beam widths.

FIG. 7 illustrates graphs of the sweep to sweep returns of a target in one range bin over consecutive sweeps to show the occurrence of antenna beam shape weighting as part of the detection process. Segments are drawn from the base line 121 to illustrate a given range bin over 25 consecutive sweeps. These 25 sweep times are equally applicable to all of the graphs of FIG. 7 which will be subsequently discussed. It should be recalled that the transmitted power from the transmitter 15 is periodically radiated into space at the master trigger rate as the antenna assembly 25 of FIG. 1 is rotated in azimuth. As a result, the information contained in a given range bin is derived from different azimuth positions as the antenna assembly 25 is rotated.

The sweep to sweep output of the quantizer 27 for a given range bin is illustrated by the graph 123. The sequentially indicated quantities of zero, one, three, five, six, five, four, one and zero indicate relative analog amplitudes for a given range bin between sweeps one and nine, with the center of the target occurring during the fifth sweep.

The sweep to sweep output of the Markov counter 29 for the given range bin, where $K$ = −4 for the counter 29, is illustrated by the graph 125. The sequentially indicated quantities of zero, one, four, nine, 15, 20, 24, 25, 21, 17, 13, nine, five, one and zero represent the updated values of the quantities shown in the graph 123 and range over sweeps one through 15. The zero quantity for the first sweep in the graph 125 is due to the fact that no target echo was returned during that range bin interval as indicated in the graph 123. At sweep number 2 the graph 125 indicates the amplitude of one which is the amplitude for the given range bin at the output of the quantizer 27 during the second sweep. The one that had been developed at the output of the counter 29 during the second sweep is updated by the quantity 3 in the graph 123 to produce an amplitude of four during sweep three of the graph 125. In a like manner, the quantities four, nine, 15, 20 and 24, which are respectively clocked out of the memory 51 of the counter 29 during the sweeps four through eight, are respectively updated by the quantities five, six, five, four and one shown in the graph 123 to respectively develop the quantities nine, 15, 20, 24, and 25 during the sweeps four through eight. For illustrative purposes, the value of $K$ in the Markov counter 29 was chosen to be −4. Since the quantizer 27 develops a five bit output equal to 0 in amplitude for the sweeps nine through 26, the Markov counter 29 decrements by the value of $K$, or −4, for the sweeps 9 through 15 until the output of the Markov counter 29 reaches zero and remains at zero. It should be noted that the Markov counter is designed to not develop an output quantity below zero. As a result, the 1 developed in the graph 125 at sweep 14 only decrements to a zero for sweep 15 rather than to a −3.

The sweep to sweep amplitudes of the five most significant bits (MSBs) of the output of the Markov counter 29 for the given range bin are illustrated by graph 127. By choosing the five most significant bits of the output of the Markov counter 29, the sequentially indicated amplitudes zero, one, four, nine, 15, 20, 24, 25, 21, 17, 13, nine five, one and zero of the graph 125 are effectively divided by 4 to respectively obtain the quantities zero, zero, one, two, three, five, six, six, five, four, three, two, one, zero and zero for the respective sweeps one through 15.

The sweep to sweep output of the Markov counter 31 for the given range bin is illustrated by graph 129. From sweep 1 through sweep 23 the values of the amplitudes are zero, zero, one, three, six, 11, 17, 23, 28, 32, 35, 37, 38, 34, 30, 26, 22, 18, 14, 10, six, two and zero, and are obtained by incrementing the old data from the memory 51 in the counter 31 by the respective values shown in the graph 127 until the graph 127 decreases to one on sweep 13, at which time the output of the Markov counter 31 has reached a peak value of 38. After the peak value of 38 has been reached, the Markov counter 31 decrements the old data by four, when its $K$ value is equal to −4. As a result, the values 34, 30, 26, 22, 18, 14, 10, six, two and zero are respectively developed for the given range bin by the counter 31 for the sweeps 14 through 23. The detection threshold for the counter 31 is set at a value of 14, for example. During the seventh sweep, the value of 17 for the given range bin exceeds the threshold level of 14, at which time an active bit is generated or written by the threshold comparator circuit 37 (FIG. 1) to declare that the leading edge of a target has been detected for this range bin. As will subsequently be explained, the active bit control circuit 35 and the peak detector circuit 33 of FIG. 1 are mechanized to recirculate the active bit until the old data is decremented three consecutive times at which time a peak-is-declared signal is generated by the peak detector circuit 33 to indicate that a target is detected. More specifically, an updated peak value of 38 is reached for this range bin during the thirteenth sweep. As specified before this peak value of 38 is then successively decremented during the sweeps 14 through 23 until a zero value is reached. Therefore, the peak-is-declared signal for this range bin is generated during the sixteenth sweep. It should be noted that in the graph 123 the true target center actually occurred during the fifth sweep but the target was not declared until the sixteenth sweep, at which time the antenna is positioned at a different azimuth. As a result, there is a bias of 11 sweeps (declared target center minus true target center) which must be compensated for in the output gating circuit 41 of FIG. 1 in order to indicate the proper azimuth at which the target center occurred. To correct for the sweep bias, which will be considered later, eleven sweeps must be subtracted from the declared target center, or azimuth position at the time the peak-is-declared signal is generated.

Figure 8:
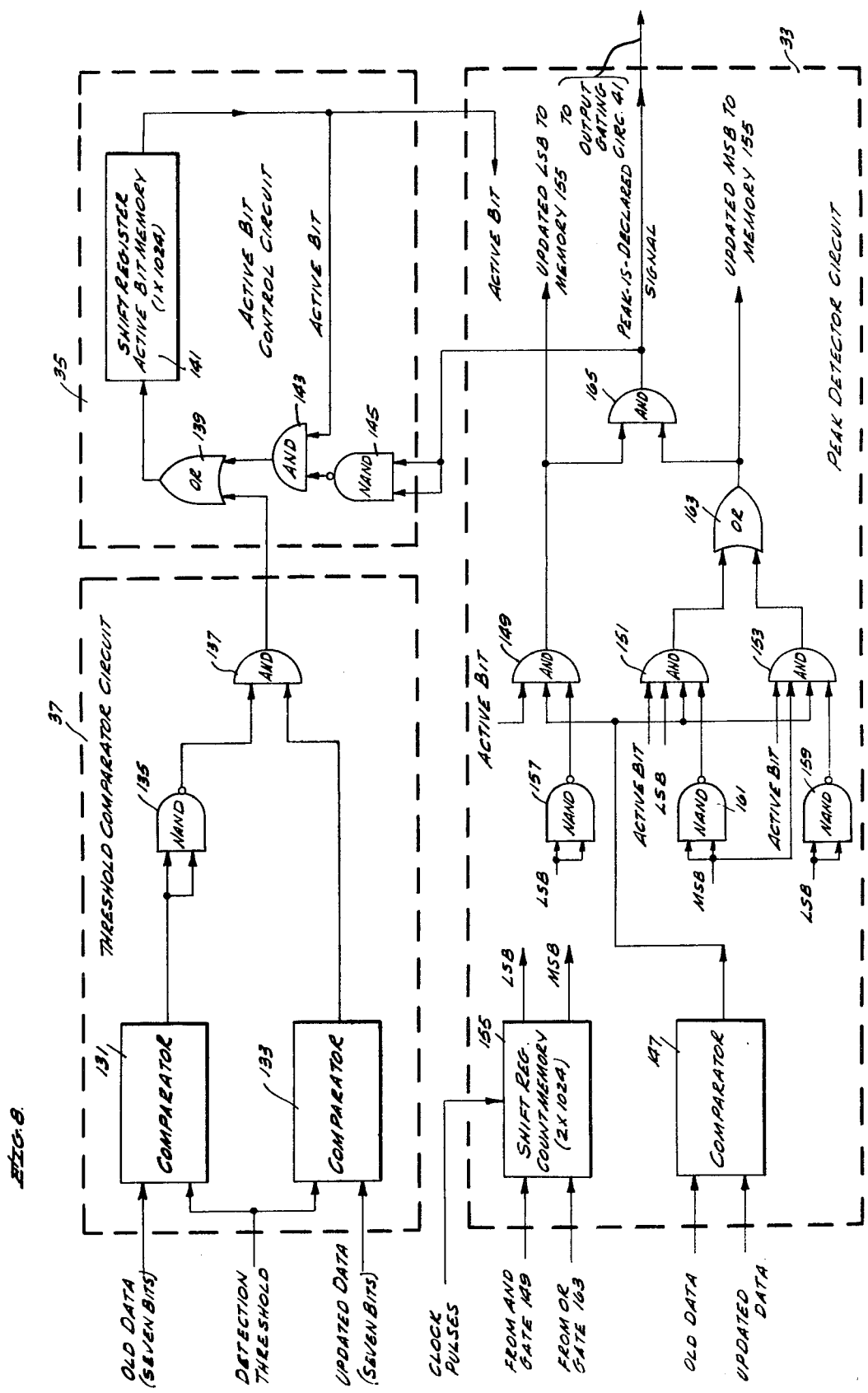
FIG. 8 is a schematic block diagram of the threshold comparator 37, active bit control 35 and peak detector 33 circuits of FIG. 1.

Referring now to FIG. 8, the threshold comparator circuit 37, the active bit control circuit 35 and the peak detector circuit 33 will now be more fully explained. The old data taken from the output of the memory 51 of FIG. 3 and the updated data applied to the input of the memory 51, each being seven bits wide, are respectively applied to comparators 131 and 133 in the threshold comparator circuit 37. An eight bit detection threshold level or word, from a set of switches or any suitable source of a multibit binary word, is applied to both of the comparators 131 and 133 for comparison purposes. The comparators 131 and 133 are similar to the comparator 61 in FIG. 4. The output of the comparator 131 is inverted by a NAND gate 135 and then applied to the upper input of an AND gate 137, while the output of the comparator 133 is directly applied to the lower input of the AND gate 137.

The threshold comparator circuit 37 is mechanized such that an active bit is declared whenever the old data (O.D.) is below the detection threshold level at the same time that the updated data (U.D.) is above the detection threshold level, as indicated in graph 129 in FIG. 6. When the old data (O.D.) is greater than the detection threshold level the comparator 131 develops a 1 state signal which is inverted by the NAND gate 135 to prevent the AND GATE 137 from declaring an active bit. The comparator 133 also produces a 1 state output when the U.D. is greater than the detection threshold level. When the old data is less than the detection threshold level, the 0 state output from the comparator 131 is inverted by the NAND gate 135 to provide a binary 1 to the upper input of the AND gate 137. As a result, the AND gate 137 will only declare an active bit for a range bin when the old data is less than the threshold level while the updated data exceeds the threshold level. When these conditions simultaneously occur, the AND gate 137 produces a 1 state or active bit signal output, which is applied to the active bit control circuit 35.

An active bit from the threshold comparator circuit 37 is applied through an OR gate 139 to be stored in a shift register active bit memory 141 in the active bit control circuit 35. This active bit memory 141, similar to one of the shift registers of the memory 51, comprises one shift register of 1024 bits in length (designated as 1 × 1024), with each bit corresponding to a range bin. This memory 141 is also shifted by clock pulses so that after one complete radar ranging time the data being stored is shifted back to its original position. The data stored in the memory 141 is sequentially shifted from the output of the memory 141 and applied to one input of an AND gate 143. The output of a NAND gate 145 is applied to the other input of the AND gate 143. As long as the input of the NAND gate 145 is a binary 0, the output of the NAND gate 145 will be a 1 state, which enables the AND gate 143 to sequentially pass the data stored in the memory 141 therethrough and through the OR gate 139 back into the input of the memory 141 at the following clock pulse time. An active bit is therefore recirculated from the output of the memory 141 and restored in the input of the memory 141 as long as the input of the NAND gate 145 is a 0 state.

It should be recalled that the active bit will continue to recirculate until a peak-is-declared signal is generated by the peak detector circuit 33. The peak detector circuit 33 will now be examined. The old data and updated data for a given range bin are applied to a comparator 147, similar to the comparator 61 of FIG. 4. The comparator 147 will only produce a 1 state output when the O.D. is greater than the U.D. The output of the comparator 147 is applied to an input of each of AND gates 149, 151 and 153. A shift register count memory 155, similar to two of the shift registers of the memory 51 of FIG. 3, comprises two shift registers of 1024 bits in length each (designated as 2 × 1024), with each bit corresponding to a range bin. This count memory 155 is also shifted by clock pulses such that after one complete radar ranging time the data is shifted back to its original position. The least significant bit (L.S.B.) at the output of the count memory 155 is applied directly to an input of the AND gate 151, and is also applied through NAND gates 157 and 159 to the AND gates 149 and 153, respectively. The most significant bit (M.S.B.) of the count memory 155 is applied directly to an input of the AND gate 153, and is also applied through a NAND gate 161 to an input of the AND gate 151. The active bit from the output of the memory 141 is applied to each of the AND gates 149, 151 and 153. The output of the AND gate 149 is the updated L.S.B. and is returned to the input of the memory 155. The outputs of the AND gates 151 and 153 are applied to an OR gate 163. The output of the OR gate 163 is the updated M.S.B. and is returned to the input of the memory 155. The updated L.S.B. from the AND gate 149 and the updated M.S.B. from the OR gate 163 are applied to an AND gate 165, which has its output coupled to the input of the NAND gate 145.

In operation, before an active bit for a given range bin is declared by the threshold comparator circuit 37, the L.S.B. and the M.S.B. of the count memory 155 are both in 0 states. It will be recalled that an active bit will only be declared when the updated data exceeds the detection threshold level while the old data is less than the detection threshold level. Furthermore, a declared active bit will be recirculated by the active bit control circuit 35 until the count in the Markov counter 31 is decremented three consecutive times. To more fully explain the operation of the peak detection circuit 33, the graph 129 in FIG. 6 should also be considered. On the thirteenth sweep the U.D. still exceeds the O.D. As a result, the comparator 147 develops a 0 state output at this time. Therefore, all of the AND gates 149, 151 and 153 develop 0 state outputs and the updated L.S.B. and updated M.S.B. still remain in 0 states. On the fourteenth sweep the count of the Markov counter 31 is decremented the first time by the value of K. Therefore, at the time of the fourteenth sweep the O.D. exceeds the U.D. and the comparator 147 develops a 1 state output. Since, at the time of the fourteenth sweep, the comparator 147 develops a 1 state output, the active bit from the memory 141 is in a 1 state, and the 0 state L.S.B. from the memory 155 is inverted by the NAND GATE 157 the updated LSB from the output of the AND gate 149 changes to a 1 state. Since the L.S.B. and M.S.B. from the count memory 155 are both in 0 state conditions at this time, they respectively disable the AND gates 151 and 153, thereby causing the updated M.S.B. from the output of the OR gate 163 to remain in a 0 state. The count of one (a binary 01) is then stored in the count memory 155 for the given range bin.

During the next or fifteenth radar sweep the 1 state L.S.B. and the 0 state M.S.B. are read out from the count memory 155, and the comparator 147 again develops a 1 state output since the O.D. exceeds the U.D. for the given range bin during this sweep. The 1 state L.S.B. is inverted by the NAND gate 157 to cause the AND gate 149 to develop an output 0 state updated L.S.B. for the sweep 15. The inversion of the 1 state L.S.B. by the NAND gate 159 also disables the AND gate 153. However, since the comparator 147 is now developing a 1 state output, the active bit is in a 1 state, the L.S.B. is in a 1 state, and the 0 state M.S.B. is inverted by the NAND gate 161, the AND gate 151 develops a 1 state output which is applied through the OR gate 163 as a 1 state updated M.S.B. This count of two (a binary 10 since the updated L.S.B. = 0 and the updated M.S.B. = 1) is re-stored in the count memory 155.

On the sixteenth sweep the 0 state L.S.B. and the 1 state M.S.B. are read out of the count memory 155, and the comparator 147 again develops a 1 state output since the O.D. exceeds the U.D. for the given range bin during this sixteenth sweep. Since the comparator 147 is now developing a 1 state output, the active bit is still in a 1 state, and the 0 state L.S.B. from the memory 155 is inverted by the NAND gate 157, the updated L.S.B. output from the AND gate 149 will change to a 1 state. At the same time, the 0 state L.S.B. from the memory 155 will disable the AND gate 151. However, since the comparator 147 has a 1 state output, the active bit is in a 1 state, the M.S.B. is in a 1 state, and the 0 state L.S.B. is inverted by the NAND gate 159, the AND gate 153 will apply a 1 state output through the OR gate 163. At this time, therefore, the updated L.S.B. and the updated M.S.B. are both in a 1 state condition, indicating that a count of three has been obtained. As a result, the output of the AND gate 165 changes to a 1 state, or peak-is-declared signal, which is applied to the output gating circuit 41 of FIG. 1. The peak-is-declared signal from the AND gate 165 is also inverted by the NAND gate 145, thereby disabling the AND gate 143. The active bit from the output of the active bit memory 141 is therefore erased from the memory 141, since it is prevented from being re-stored in the memory 141. On the seventeenth sweep, since the active bit is erased, the AND gates 149, 151 and 153 all develop 0 state outputs, which cause 0 state updated L.S.B. and 0 state updated M.S.B. signals to be re-stored in the memory 155 for that range bin.

The output gating circuit 41 of FIG. 1 is illustrated in FIG. 9. The output ten bits of the range counter 21 of FIG. 1 are respectively applied to the lower inputs of AND gates 171 through 180, while the output ten bits of the azimuth counter 39 are respectively applied to the lower inputs of AND gates 181 through 192. When the peak-is-declared signal is generated by the peak detector circuit 33, the AND gates 171 through 192 are enabled to allow the outputs of the range and azimuth counters 21 and 39 to pass therethrough.

The outputs of the AND gates 181 through 192 are applied to a subtractor 195. Also applied to the subtractor 195 is the sweep bias, described in relation to the graph 129 of FIG. 7, to correct for the azimuth error introduced by the system. This sweep bias may be a five bit word supplied from a set of switches or any suitable source of a multibit binary word (not shown). In the specific case illustrated in FIG. 7, the sweep bias would be 11 (a binary 01011). Therefore, 11 would be subtracted from the count of the azimuth counter 39 to correct for the azimuth lag. If the subtraction of the sweep bias from the count of the counter 39 results in a positive number, that positive number is the proper azimuth for the center of the target. If the subtraction of the sweep bias from the count of the counter 39 results in a negative number, then the absolute value of that negative number is subtracted from a fixed number 4096 to produce the proper azimuth for the center of the target. The output of the subtractor 195 would therefore indicate the correct target azimuth and would be sent, along with the target range information from the range counter 21, to a user which, as specified before, may be a computer, an indicating system, a digital read out, or any other suitable output device for utilizing the target information.

While the invention was specifically described in regard to one range bin, it is to be realized that target returns can occur in more than one range bin, and that the operation of the system for each of the 1024 range bins in a radar sweep is the same as that described in relation to the one range bin.

The invention thus provides a radar target detector system which utilizes two or more amplitude-weighted, cascaded digital integrator detectors, in conjunction with other comparator, detector, control, counter and gating circuits, to perform antenna beam shape weighting as part of the detection process.

While the salient features have been illustrated and described, it should be readily apparent to those skilled in the art that modifications can be made within the spirit and scope of the invention as set forth in the appended claims.

What is claimed is:

1. A target detection system comprising:
   first means for selectively updating each of a first plurality of multibit words respectively associated with a plurality of range intervals in a radar sweep as a function of the amplitude of video target returns for each of the plurality of range intervals;
   second means coupled to said first means for selectively updating each of a second plurality of multibit words respectively associated with the plurality of range intervals in the radar sweep as a function of the amplitude of a scaled down portion of each of the updated first plurality of multibit words from said first means; and
   third means coupled to said second means for generating a signal output indicative of the azimuth center and range of each target detected in any of the range intervals in the radar sweep.

2. The target detection system in claim 1 wherein each of said first and second means comprises:
   accumulator means for storing the associated plurality of multibit words respectively associated with the plurality of range intervals in the radar sweep; and
   a first control circuit, coupled to said accumulator means, being responsive to the multibit words applied thereto for generating control signals to selectively cause said accumulator means to sequentially update and restore as updated multibit words its previously stored multibit words by incrementing or decrementing each previously stored multibit word associated with each range interval as a function of the amplitude of the corresponding multibit word applied thereto.

3. The target detection system of claim 2 wherein said accumulator means comprises:
   first memory means having input and output circuits for storing the multibit word for each range interval in the radar sweep; and
   a second control circuit, coupled to said first memory means and said first control circuit, being responsive to the multibit words and control signals applied thereto for sequentially updating each of the previously stored multibit words at said output circuit of said first memory means and restoring same in said input circuit of said first memory means.

4. The target detection system of claim 3 wherein said second control circuit includes:
   fourth means coupled to said first control circuit for decrementing any previously stored multibit word by a first predetermined quantity when the amplitude of the corresponding multibit word applied thereto does not exceed a first level;
   fifth means coupled to said first control circuit for incrementing any previously stored multibit word by a second predetermined quantity when the amplitude of the corresponding multibit word applied thereto is above a second level; and
   sixth means coupled to said first control circuit for incrementing any previously stored multibit number by the amplitude of the corresponding multibit word applied thereto when the amplitude of the corresponding multibit word applied thereto is between the first and second levels.

5. The target detection system of claim 4 wherein said second control circuit further includes:
   a first gating circuit, coupled to said fourth, fifth and sixth means, being responsive to the control signals from said first control circuit for selectively returning updated multibit words from said fourth, fifth and sixth means to said input circuit of said first memory means as a function of the amplitude of the multibit words applied to said first control circuit.

6. The target detection system of claim 5 wherein said third means includes:
   threshold detection means, coupled to said accumulator means of said second means, being responsive to the updated and previously stored multibit words therefrom associated with each range interval for developing and storing an active bit signal representing the presence of a target signal in any of the plurality of range intervals in the radar sweep; and
   peak detection means, coupled to said threshold detection means and to said accumulator means of said second means, for generating a signal output indicative of the azimuth center and range of each target detected.

7. The target detection system of claim 6 wherein said threshold detection means comprises:
   comparator means, coupled to said accumulator means of said second means and adapted to receive a detection threshold signal of a preselected amplitude, for developing the active bit signal for any given range interval when the amplitude of the updated multibit word for the given range interval exceeds that of the detection threshold signal while the amplitude of the previously stored multibit word for the given range interval is less than that of the detection threshold signal;

second memory means coupled to said comparator means for storing and periodically reading out any active bit signal developed by said comparator means; and first gating means coupled to said second memory means for causing the active bit signal for any given range interval to be restored in said second memory means as long as said peak detection means does not generate a signal output indicative of the azimuth center and range of each target detected.

8. The target detection system of claim 7 wherein said peak detection means comprises:

a peak detector circuit, responsive to the updated and previously stored multibit words from said accumulator means of said second means for each range interval and to the active bit signal from said second memory means for each corresponding range interval, for generating a first signal; and second gating means, coupled to said peak detector circuit, being responsive to each first signal therefrom for developing the signal output indicative of the azimuth center and range of each target detected.

9. The target detection system of claim 8 wherein said second gating means includes:

seventh means coupled to said peak detector circuit and adapted to receive sequences of range information signals; and eigth means coupled to said peak detector circuit and adapted to receive sequences of azimuth information signals, said seventh and eighth means being respectively responsive to each first signal from said peak detector circuit for providing the signal output indicative of the range and azimuth center of each target detected.

10. The target detection system of claim 9 wherein said eighth means includes:

means responsive to the azimuth information signals for compensating for a predetermined error in the azimuth center of each target detected.

11. A target detector system responsive to a plurality of quantized video returns corresponding to a plurality of range intervals over a plurality of radar sweeps for performing antenna beam weight shaping as a part of the detection process comprising:

a plurality of up-down counter means coupled in series and responsive to the quantized video returns for performing the antenna beam shape weighting while detecting the presence of targets in any of the range intervals, said plurality of up-down counter means having selectable decrementing constants as a function of a desired impulse response for the system; and means coupled to said plurality of up-down counter means for generating signals indicative of the azimuth center and range of each target detected in any of the range intervals.

12. In a radar receiving system, a target detector system for performing antenna beam shape weighting while detecting the presence of target signals in any of a plurality of range intervals in each of a plurality of radar sweeps comprising:

a video quantizer responsive to radar video from any range interval in any radar sweep for providing a corresponding multibit word whose numerical value is a function of the peak of the radar video from that range interval;

first accumulator means coupled to said video quantizer for storing multibit words respectively associated with the plurality of range intervals;

a first control circuit, coupled to said first accumulator means, being responsive to the multibit words from said video quantizer for causing said first accumulator means to sequentially update and restore as updated multibit words its old stored multibit words by incrementing or decrementing each old stored multibit word associated with each range interval as a function of the amplitude of the multibit word from said video quantizer for the corresponding range interval;

second accumulator means coupled to said first accumulator means for storing multibit words associated with the plurality of range intervals;

a second control circuit, coupled to said second accumulator means, being responsive to a scaled down portion of the updated multibit words from said first accumulator for causing said second accumulator means to update and restore as updated multibit words its old stored multibit words by incrementing or decrementing each old stored multibit word associated with each range interval as a function of the amplutude of the scaled down portion of the updated multibit word from said first accumulator means for the corresponding range interval;

threshold detection means, coupled to said second accumulator means, being responsive to the old and updated multibit words therefrom associated with each range interval for developing and storing an active bit signal representing the presence of a target signal in any of the plurality of range intervals in a radar sweep; and peak detection means coupled to said second accumulator means and said threshold detection means for generating a signal indicative of the azimuth center and range of each target detected.

* * * * *

PO-1050
(5/69)

UNITED STATES PATENT OFFICE
CERTIFICATE OF CORRECTION

Patent No. 3,683,380                              Dated    August 8, 1972

Inventor(s)  THOMAS C. CANTWELL, JR. and RICHARD D. WILMOT

It is certified that error appears in the above-identified patent and that said Letters Patent are hereby corrected as shown below:

Column 7, line 35, after "such" insert --as--.

Column 9, line 33, delete "AND" and insert --the--.

Column 10, line 64, after "12" insert --is--.

Column 12, line 17, delete "121".

Column 15, line 43, change "FIG. 6" to --FIG. 7--.

Column 19, line 34, change "eigth" to --eighth--;

Column 19, line 54, delete "weight shaping" and insert

--shape weighting--.

Signed and sealed this 29th day of May 1973.

(SEAL)
Attest:

EDWARD M. FLETCHER, JR.            ROBERT GOTTSCHALK
Attesting Officer                  Commissioner of Patents